Nov. 12, 1940.    F. W. LINDBLOM    2,221,736
OPHTHALMIC MOUNTING
Filed Feb. 15, 1938
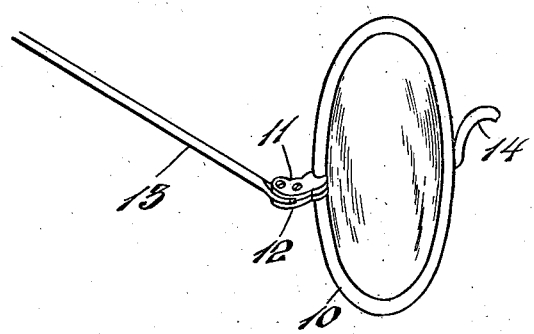
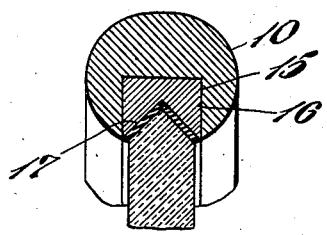 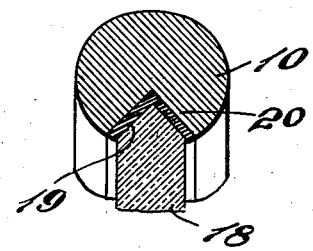
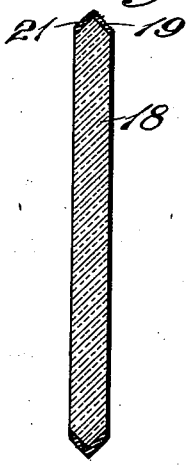 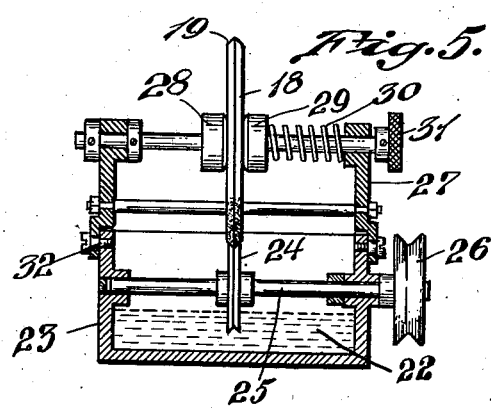
INVENTOR.
Frank W. Lindblom
BY
Barlow & Barlow
ATTORNEYS.

Patented Nov. 12, 1940

2,221,736

UNITED STATES PATENT OFFICE 2,221,736

OPHTHALMIC MOUNTING

Frank W. Lindblom, Cranston, R. I., assignor to Welsh Manufacturing Company, a corporation of Rhode Island Application February 15, 1938, Serial No. 190,605

3 Claims. (Cl. 88—47)

This invention relates to an ophthalmic mounting; and has for one of its objects the provision of a cushion between the rim and the edge of the lens enabling the lens to be positioned in such a manner as to be firmly mounted even though some little differences exist in the size of the lens and the rims.

Another object of the invention is to so mount a lens in a rim that differences in size due to expansion or contraction because of heat changes will be readily absorbed and the lens will not be cracked.

With these and other objects in view, the invention consists of certain novel features of construction, as will be more fully described, and particularly pointed out in the appended claims.

In the accompanying drawing:

Fig. 1 is a perspective view of one lens rim and lens of a spectacle with the bridge fragmentally shown;

Fig. 2 is a sectional view on a larger scale showing a lens rim and lens therein;

Fig. 3 is a view similar to Fig. 2 but of a slightly modified structure;

Fig. 4 is a sectional view of the lens with a rubber coating applied to its edge;

Fig. 5 is a sectional view illustrating one way of applying a coating of latex to the edge of the rim.

In the use of metal rims for lenses such as in spectacles or the like contraction and expansion due to changes in temperature occur, and when the lens is bound in position in the rim under some conditions breakage may occur by reason of these changes in size and pressure developed by the contraction and expansion; and in order that this condition may be taken care of and also that shocks occurring may be absorbed while the mounting is in use I have provided a cushion layer of rubber applied between the edge of the lens and the rim so as to permit of certain compression of this rubber substance for accommodating different sizes due to heat changes; and the following is a more detailed description of the present embodiment of this invention, illustrating the preferred means by which these advantageous results may be accomplished:

With reference to the drawing, 10 designates the lens rim provided with end pieces 11 and 12 with a temple 13 extending from the end pieces and a bridge 14 for connecting the two lens rims together.

The lens rim 10 is recessed as at 15 and may be provided with an inner rim 16 of different material which is recessed as at 17 in a shape to receive the lens 18. In the particular illustration here shown the lens is V-shaped as at 19 on its edge and accordingly the recess 17 in the rim is also V-shaped on an angle to substantially correspond with that of the edge 19 of the lens. In some instances the rim 10 instead of having the inner rim 16 is recessed directly as at 20 in a V-shaped formation for the reception of the edge 19 of the lens 18.

Before mounting the lens in the rim I apply a coating 21 of rubber latex in any suitable manner to the lens, preferably by providing a bath 22 in a container 23 by having a revolving applicator wheel 24 which may be rotated through shaft 25 and pulley 26. A swinging framework 27 pivoted as at 32 provides a support for the lens 18 by means of clamps 28 and 29, the latter of which is spring pressed as at 30 with a controlling handle 31. The lens may be clamped approximately on center through some suitable jig and the swinging frame 27 may be allowed to tilt toward the wheel 24 so that the V-shaped edge 19 of the lens will rest against a V-shaped groove in the wheel or applicator 24. As the parts revolve the frame may swing up and down to accommodate any out of center periphery of the lens and a coating of latex will be deposited upon the lens. If desired, the coating may be applied in the rim rather than on the lens. This may be allowed to congeal to some extent and then the lens may be mounted in the rim so that the coating of rubber latex will be between its edge and the groove of the rim. Tightening of the lens by means of the end pieces will be such as to yieldingly bind the lens in position and yet contraction and expansion may be accommodated by reason of the elasticity of the rubber layer provided.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. An ophthalmic mounting having in combination a lens rim with an internal lens receiving recess therein, a lens having an edge to enter said recess, and a layer of rubber latex positioned in said recess completely about the lens between the contacting surfaces of said lens and a wall of the recess to cushion the mounting of said lens in said rim, said latex rubber layer being congealed in situ on the lens from rubber latex and also acting as a cement to assist in holding the lens in said recess.

2. The method of mounting a lens in a rim having an internal recess to receive the lens which consists in applying a liquid coating of rubber latex to the edge portion only of the lens and completely about the same, causing the rubber latex to congeal sufficiently to form a layer on the edge portion only of the lens, and while the layer is still tacky positioning the lens on the rim with the rubber latex positioned between the edge of the lens and the rim for adhesively attaching the lens to the rim by the latex.

3. The method of mounting a lens in a rim having an internal recess to receive the lens which consists in applying a liquid coating of rubber latex to the edge portion only of the lens and completely about the same, by causing the lens edge to engage an applicator and rotating the lens and applicator sufficiently to cause the lens to move at least one complete revolution while remaining in continual contact with the applicator by movement to accommodate eccentricity of its periphery and before the layer of rubber latex has completely congealed, positioning the lens in the rim to adhesively attach the lens to the rim by the latex.

FRANK W. LINDBLOM.